United States Patent
Crooks

(10) Patent No.: US 10,891,455 B1
(45) Date of Patent: Jan. 12, 2021

(54) PRODUCE IDENTIFICATION METHODS AND DEVICE

(71) Applicant: NCR Corporation, Atlanta, GA (US)

(72) Inventor: John Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/586,342

(22) Filed: Sep. 27, 2019

(51) Int. Cl.
*G06K 7/06* (2006.01)
*G06K 7/12* (2006.01)
*G06K 9/00* (2006.01)
*G06K 7/10* (2006.01)

(52) U.S. Cl.
CPC ............. *G06K 7/12* (2013.01); *G06K 7/1092* (2013.01); *G06K 9/00671* (2013.01)

(58) Field of Classification Search
CPC .. G06K 7/10722; G06K 7/1478; G06K 7/109; G06K 7/10524
USPC .................. 235/462.41, 462.45, 472.01, 383
See application file for complete search history.

(56) References Cited

U.S. PATENT DOCUMENTS

| | | | | |
|---|---|---|---|---|
| 4,954,972 A | * | 9/1990 | Sullivan | G01J 3/02 356/328 |
| 5,319,437 A | * | 6/1994 | Van Aken | G01J 3/02 356/326 |
| 5,471,311 A | * | 11/1995 | van den Bergh | B07C 5/3416 250/226 |
| 5,546,475 A | * | 8/1996 | Bolle | G06K 9/4647 382/190 |
| 5,675,070 A | * | 10/1997 | Gelperin | G01N 33/0011 73/23.34 |
| 5,867,265 A | * | 2/1999 | Thomas | G01N 21/25 356/328 |
| 6,155,489 A | * | 12/2000 | Collins, Jr. | G01G 19/4144 235/462.01 |

* cited by examiner

*Primary Examiner* — Daniel St Cyr
(74) *Attorney, Agent, or Firm* — Schwegman, Lundberg & Woessner

(57) ABSTRACT

A controlled image sample is obtained of a produce item. The controlled image sample may be captured using an integrated camera of a mobile device or by a specialized produce image meter from a handheld scanning device. The image sample is processed to obtain a produce signature that is unique to a type of produce associated with the image sample. The produce signature is matched to a specific produce identifier and the produce identifier is added to a list of items being purchased by a shopper through a self-shopping system.

19 Claims, 4 Drawing Sheets

PRODUCE IDENTIFICATION METHODS AND DEVICE

BACKGROUND

Grocery shopping has advanced significantly in recent years. Consumers can now scan their grocery items with their own mobile phones and/or with store-provided mobile scanning devices. Barcoded items make scanning and item identification quick and efficient. However, there are a several complications for both the grocery stores and the consumers when it comes to items sold by weight, such as produce.

Produce is either sold by quantity or by weight and often there are no barcodes on the produce itself; rather, the consumer may be required to scan a barcode on produce shelving or perform a search to select the proper produce item being purchased. Another complication is that some produce may be organic and significantly more expensive than a same type of produce that is non-organic, such that misidentification by the consumer can be costly to the retailer or to the consumer if the consumer scans a shelf code for organic produce when the consumer actually took non-organic produce. It may also be that the consumer intentionally scans a less expensive produce barcode to steal from the retailer.

A variety of techniques have been implemented by retailers with their self-shopping systems in an attempt to alleviate some of the above-noted problems and provide some measure of theft detection/prevention.

Typically, self-shopping systems include a user-facing interface that allows the consumer to snap a picture of the produce item, which then displays a listing of potential produce items for the consumer to select from. There are many different variations for any given produce type (for example oranges) and many different types of produce have similar shapes and colors. As a result, produce selection through the user-facing interface may entail paging through many screens full of selections many of which visually appear similar to that which the consumer intended to purchase. This slows down the self-shopping experience, frustrating the consumer and adversely impacting the retailer, especially when incorrect produce selections are made by the consumer.

SUMMARY

In various embodiments, produce identification methods and a produce identification device are provided.

According to an aspect, a method for produce identification using a produce identification device is presented. An image device, which is integrated within a second device, is controlled upon detection of an activation event produced from the second device. An image sample of a target item is captured by the image device. A signature is generated that uniquely identifies the target item from the image sample. An identifier for the target item is obtained based on the signature.

DETAILED DESCRIPTION

Figure 1:
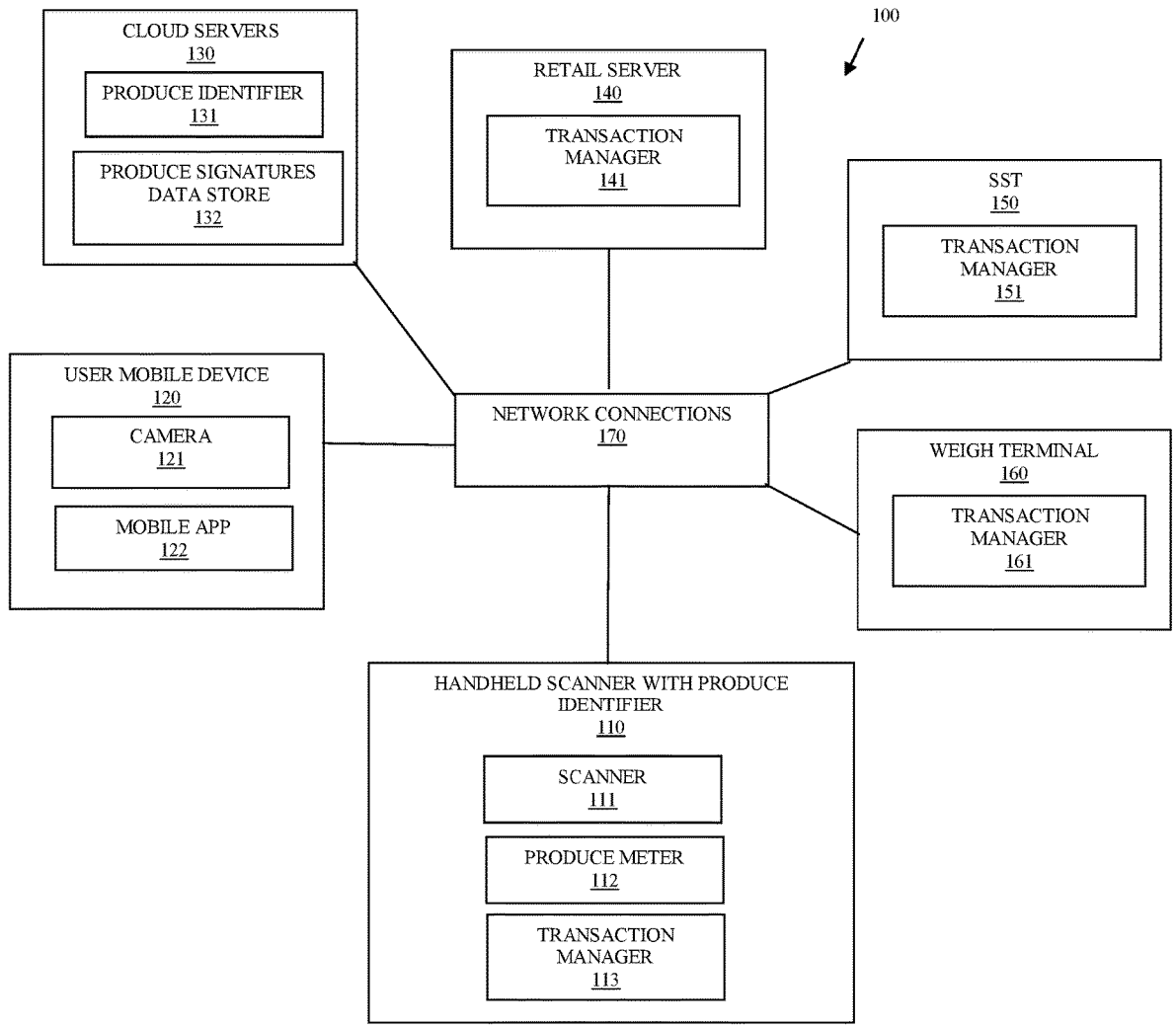
FIG. 1 is a diagram of a system for produce identification with a produce identification device within a self-shopping system, according to an example embodiment.

FIG. 1 is a diagram of a system 100 for produce identification with a produce identification device within a self-shopping system. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of produce identification, presented herein and below.

As used herein and below, the terms "user," "consumer," "shopper," and "customer" may be used interchangeably and synonymously. The terms refer to an individual that is performing self-shopping using a modified and enhanced self-shopping system as discussed herein and below.

As used here and below a "self-shopping system" or a "mobile-shopping system" is intended to mean that a customer/consumer shops and scans in the store aisles using either a personal smart phone (user mobile device 120), or a dedicated handheld shopping device (handheld scanner with produce identifier 110) that may be pick up from a kiosk within the store.

Modifications made to a user mobile device's camera settings within a mobile application 122 as part of a self-shopping system or modifications made to an existing handheld scanner device used with a shelf-shopping system are provided herein and below. The modifications allow for improved produce recognition and identification and/or substantially reduces selections of produce items when a direct produce identification is unable to be made.

Enhancements or modifications are made to an existing mobile application utilized for self-shopping as mobile app 122. The enhancements include features to custom-correct color for each user mobile device 120, optimize the camera operating mode, and maintain a controlled camera distance for purposes of maximizing computer vision of the target produce that is being identified in the resulting image.

Enhancements are made to an existing handheld scanner device to include a specialized identification device that is capable of obtain an image with improved characteristics for ensuring proper target produce identification. The specialized identification is activated via its own trigger mechanism on the enhanced handheld scanner with produce identifier 110.

The improved image sample of the target produce captured by the enhanced mobile app 122 and/or the handheld scanner with produce identifier 110 allows for a unique color, texture, or shape value to be computed from the image, which uniquely identifies the target produce quickly and accurately.

System 100 includes a plurality of processing devices and device types 110-160. The system 100 includes a handheld scanner with produce identifier 110, a user-mobile device 120, cloud servers 130, a retail server 140, a Self-Service Terminal (SST), and a weigh station or terminal 160. Each device 110-160 includes its own processors and non-transitory computer-readable media to execute executable instructions that cause the corresponding processors on the corresponding devices 110-160 to perform the processing associated with transaction manager 113, mobile application (app) 122, produce identifier 131, transaction manager 141, transaction manager 151, and transaction manager 161.

Figure 2:
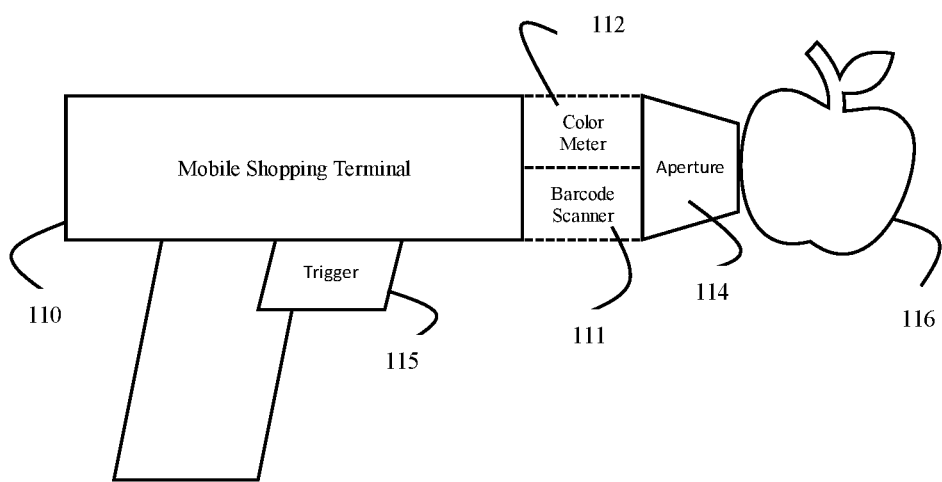
FIG. 2 is a diagram of a produce identification device for produce identification, according to an example embodiment.

As shown in FIGS. 1 and 2, the enhanced mobile shopping tool or handheld scanner with produce identifier 110 includes a camera or scanner 111, a produce meter 112, a transaction manager 113, an aperture (hole) 114 enclosed in a housing around the nozzle, and a dedicated activation trigger 115.

In an embodiment, the produce meter 112 is a low-cost, spot-type color meter that is added to an existing design of a mobile shopping device. The meter 112 may include red, green, and blue independently-controlled illumination Light-Emitting Diodes (LEDs), with a discrete monochrome photo sensor. Similar arrangements are used for measuring paint and fabric color.

The meter 112 includes a small aperture 114. During operation, a user presses a housing surrounding the aperture 114 against produce 116 (such as an apple as shown in FIG. 2) and a color measurement is taken. As shown in FIG. 2, the aperture 114 is shared with the scanner 111 of the handheld scanner with produce identifier 110, such that barcodes are read by the scanner 111 through aperture 114 and color sampled are taken through aperture, when the user presses the aperture housing (nozzle) against the produce 116 and squeezes the dedicated meter-activation trigger 115.

The dedicated trigger 115 has a number of unique benefits including: saving battery power of the handheld scanner with produce identifier 110 by keeping illumination associated with meter 112 off until needed by the user; increases accuracy by not enabling produce identification processing until meter 112 is in contact with the target produce (nothing is attempted to be identified until trigger 115 is depressed by the user); and increases security since squeezing the trigger identifies a moment when the handheld scanner with produce identifier 110 can capture an "audit frame," the audit frame can be one frame, a sequence of frames, or a short full-motion "GIF" style video before and after the time when produce identification processing occurs (the audit frame is of import to store employees to audit for fraud).

Optionally, handheld scanner with produce identifier 110 stores an audit image that includes live footage leading up to and immediately after the moment the user presses/activates trigger 115.

Transaction manager 113 permits wireless communication of the color metric to be reported to transaction manager 141 over a wireless network connection 170. Transaction manager 141 uses another network connection 170 and contacts produce identifier 131. Produce identifier 131 uses the color metric as a produce image signature and searches a produce signatures data store 132. If a match is found directly, produce identifier for produce 116 is returned by produce identifier 131 to transaction manager 141. If a direct match is not found the produces signatures within a threshold value differences are returned to transaction manager 141 for selection. If handheld scanner with produce identifier 110 includes a display (such as on a rear of handheld scanner with produce identifier 110), transaction manager 141 sends the list of produce items to transaction manager 113 over a wireless network connection 170. The user views the selection list through a user-facing interface and selects that matches produce 116. Transaction manager 113 reports the selection to transaction manager 141 over a wireless network connection 170. Transaction manager 141 records the produce identifier associated with the selection in a shopping cart for a transaction of the user having all items scanned and produce identifiers identified by handheld scanner with produce identifier 110 through meter 112.

It is noted that there may be variations in this processing flow between handheld scanner with produce identifier 110, retail server 140, and cloud servers 130; for instance, produce identifier 131 and produce signatures data store 132 may reside on retail server 140.

In cases of self-shopping systems lacking a handheld scanner with produce identifier 110, a user proceeds with self-shopping using a user's mobile device 120 in the manners discussed below.

Self-shopping systems that utilize a user's mobile device 120 use an existing mobile app (shopping app) to access the device's integrated camera 121 to read item barcodes and to snap photographs (images) of produce items. Embodiments presented herein, use new mobile app 121 to take control of camera 121 for purposes of re-purposing the camera's settings and manner in which images are taken of produce to obtain the color metric for the produce. This camera control and re-purpose is activated through a soft button displayed within a user-facing interface of the mobile app 122.

Mobile app 122 re-purposes the camera 121 (configures normal camera usage on device 120) by: performing color correction on any image captured by camera 121, changing the camera's operating mode before the image is capture, and ensuring a fixed distance between the camera's lens and the target produce item is achieved by the user when an image is captured. The resulting image with the color correction is the processed to derive the color metric.

For color correction, color and illumination are not consistent among different smart phone models, and sometimes among different units of the same model. As such, a database may be maintained that, based on a registered mobile device identifier, maps to a mobile device model. Color correction values are maintained by model and in some cases by device identifier (within a model). In some cases, a machine-learning application may be deployed and trained based on the final actual selected produce item versus what the color metric was for that produce item. In this way, the color correction can be achieved on a per-mobile-device 120 basis and continually trained and improved for accuracy. The color corrections can be specific to the model of the mobile device 120 or specific to the serial number of the mobile device 120; corrections can be fixed and occur in the same manner based on the mobile device 120 over time or can be self-learning and adjusted or changed over time from the mobile device 120. Optionally, mobile app 122 may use the user-facing interface to prompt the user and force the user to scan a color calibration target (such as a white square of paper with known color characteristics and located in a produce aisle of the store) before the soft button is capable of being activated a first time for the user on mobile device 120.

For camera operating mode, camera exposure time and focus behavior requires adjustment to maximize color accuracy and distinctiveness for produce items. Cameras typically run in an auto-exposure mode with illumination turned off. This is done to save on battery power of the mobile device 120 while at the same time always looking for an item barcode to snap a picture of when brought into focus with the camera. Mobile app 122 maintains the camera 121 in auto-exposure mode with illumination off. During self-shopping, the user-facing interface displays a soft button for produce identification that the user touches on the mobile device's display to activate changing of the camera operating mode. Once the soft button is activated, mobile app 122 changes the camera's mode of operation to white illumination with fixed exposure and fixed macro focus. After a produce item color metric is captured, mobile app 122 returns the camera back to auto-exposure mode with illumination turned off.

For maintaining a fixed and optimal distance between the lens of the camera 121 and the surface of the target produce, the camera 121 needs to be close enough to the produce so that illumination color and brightness are consistent. This ensures the dominant illumination comes from the camera 121, making measurements for the color metric more accurate. Ambient grocery store light does not have a consistent color or brightness. Mobile app 122 monitors the camera's auto-focus lens position. If the position indicates the target produce is at an optimal distance, mobile app 122 takes the image for the color metric. If the target produce is too close or too far, mobile app 122 does not allow the image to be taken for the color metric and displays a message in the user-facing interface to move the camera closer or further back for optimal distance and image taking. The right focus and right distance is determined by analyzing sharpness and contrast of images being seen by camera 121, blurry images being recorded do not have sharpness and contrast, so when the sharpness and contrast are within a predefined threshold, mobile app 122 determines the optimal distance has been achieved and an image is taken from which the color metric is derived for identifying the produce.

Mobile app 122 reports (over a network connection 170) the color metric to produce identifier 131. Produce identifier 131 looks up the color metric in produce signatures data store 132 to find a single matching produce identifier or a list of produce identifiers matching or within a predefined range of the color metric. The specific produce identifier for produce 116 is reported over a network connection 170 back to mobile app 122. Mobile app 122 either reports the produce identifier to transaction manager 141 (over a network connection 170) for purposes of maintaining a shopping cart for the user for a given shopping transaction; or mobile app 122 displays a list of potential produce items matching the color metric and a user-facing interface of mobile app 122 receives a selection of a specific produce item for produce 116 at which time mobile app 122 reports (over a network connection 170) the selected produce identifier to transaction manager 141 for insertion into the user's shopping cart for the transaction.

In an embodiment, a searching feature is maintained on handheld scanner with produce identifier 110 and the user-facing interface of mobile app 122 that permits produce searching in situations where the returned produce identifier from the color metric does not produce the needed produce identifier or does not include the needed produce identifier in a list of potential produce identifiers.

In both the handheld scanner with produce identifier 110 self-shopping and the user mobile device 120 self-shopping embodiments, the user proceeds to an SST 150 or a weight station/terminal 160 when checking out with their items from the store. In either case, transaction manager 151 or 161 requests the user to weigh the produce items on a scale (for those produce items sold by weight and not quantity). Validation of the produce item identifies in the shopping cart or grocery list associated with the customer is processed based on second images taken at SST 150 and/or weigh terminal 160 as produce items are weighed (ensuring the user has not swapped out previous produce items for different produce items or even items that are not produce). The user is then directed to pay for a total associated with the shopping cart and exits the store.

It is noted that a variety of modifications can be made, for instance produce identification can be achieved on mobile device 120 or handheld scanner with produce identifier 110 providing produce signature data store 132 is maintained on such devices 110 and 120.

The color metric as described herein is a unique computed value based on an image taken under controlled and defined conditions and from an optimal distance. The color metric may be a single scalar value calculated from the pixels of the image based on an average color value for all pixels. Alternatively, the color metric may include a distribution of color values over the image. The color metric may be viewed as a fingerprint or unique signature of a given type of produce item that is capable of distinguishing that produce item from other produce items of different types.

In an embodiment, a texture metric is used or a shape metric rather than a color metric.

In an embodiment, combinations of a color metric, a texture metric, and/or a shape metric is used rather than a color metric in isolation.

Identification of produce with self-shopping systems has been problematic. The above-noted teachings of a produce identification device and controlling a mobile device's camera alleviate these problems by capturing a controlled and accurate image metric from target produce and using such metric to uniquely identify the produce. This substantially reduces scrolling through lists of produce items for selection, speeds the self-shopping process, and reduces mistakes or theft through improved produce identification.

These and other embodiments are now discussed with reference to the FIGS. 3-4.

Figure 3:
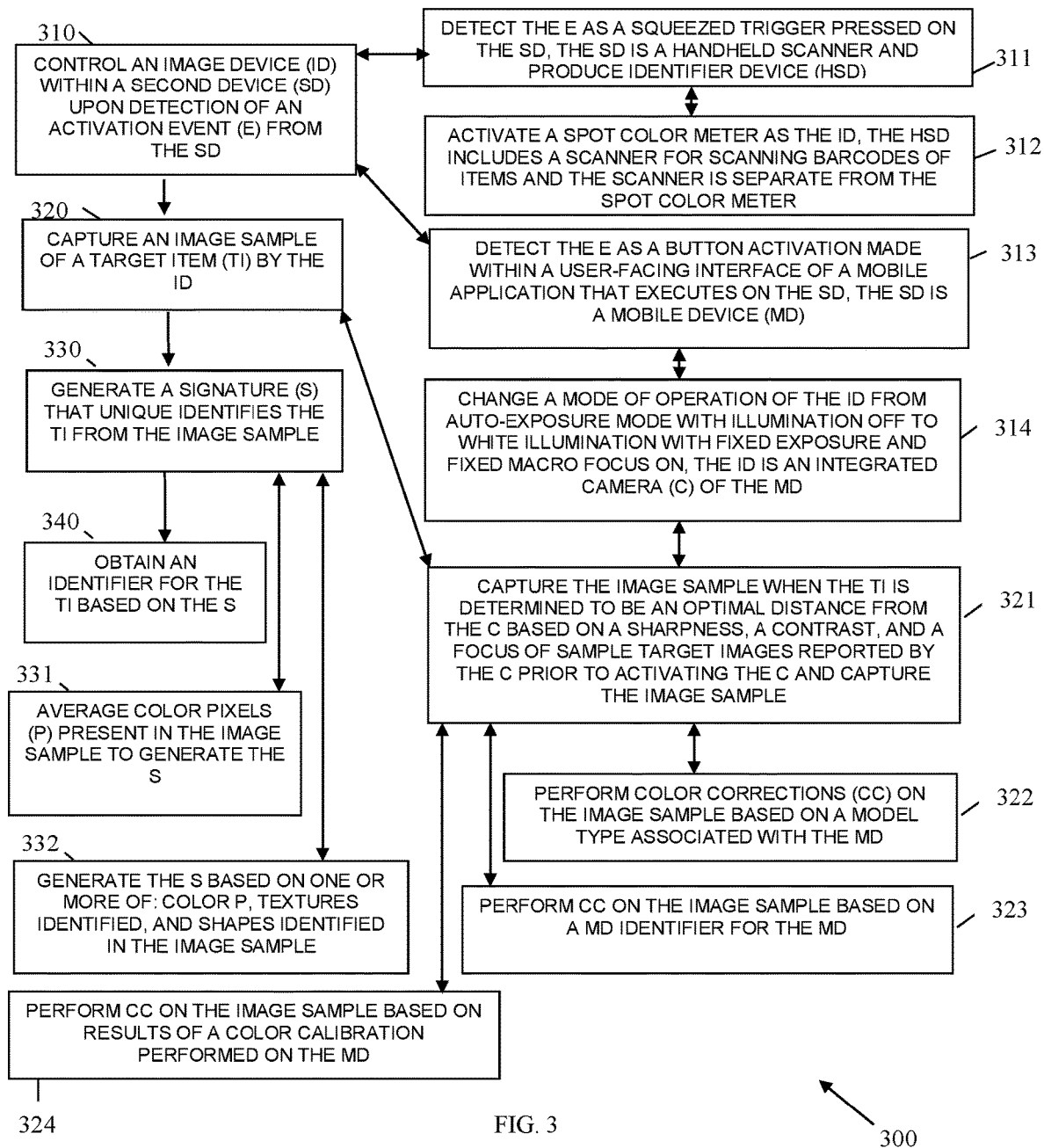
FIG. 3 is a diagram of a method for produce identification, according to an example embodiment.

FIG. 3 is a diagram of a method 300 for produce identification, according to an example embodiment. The software module(s) that implements the method 300 is referred to as a "produce identifier." The produce identifier is implemented as executable instructions programmed and residing within memory and/or a non-transitory computer-readable (processor-readable) storage medium and executed by one or more processors of a device. The processor(s) of the device that executes the produce identifier are specifically configured and programmed to process the produce identifier. The produce identifier may have access to one or more network connections during its processing. The network connections can be wired, wireless, or a combination of wired and wireless.

In an embodiment, the device that executes the produce identifier is the handheld scanner with produce identifier 110.

In an embodiment, the device that executes the produce identifier is user mobile device 120.

In an embodiment, the produce identifier is transaction manager 113.

In an embodiment, the produce identifier is mobile app 122.

At 310, the produce identifier controls an image device within a second device upon detection of an activation event from the second device. The image device is integrated within the second device (the image device is integrated within a common housing and/or within a motherboard of the second device).

In an embodiment, at 311, the produce identifier detects the event as a squeezed trigger 115 pressed on the second device. The second device is the handheld scanner with produce identifier device 110.

In an embodiment of 311 and at 312, the produce identifier activates a spot color meter 112 as the image device. The handheld scanner with produce identifier device 110 also includes an integrated scanner 111 that is a separate device from the spot color meter 112.

In an embodiment, at 313, the produce identifier detects the activation event as a button activation made within a user-facing interface of a mobile application 122 that executes on the second device. The second device is the mobile device 120.

In an embodiment of 313 and at 314, the produce identifier changes a mode of operation for the image device from auto-exposure mode with illumination off to while illumination with fixed exposure and fixed macro focus on. Here, the image device is an integrated camera 121 of mobile device 120.

At 320, the produce identifier captures an image sample of a target item through activation of the image device within the second device.

In an embodiment of 314 and 320, at 321, the produce identifier captures the image sample when the target item is determined to be an optimal distance from the camera 121 based on a sharpness, a contrast, and a focus of sample target images reported by the camera 121 prior to activating the camera 121 to capture the image sample.

In an embodiment of 321 and at 322, the produce identifier performs color corrections on the image sample based on a model type associated with the mobile device 120.

In an embodiment of 321 and at 323, the produce identifier performs color corrections on the image sample based on a mobile device identifier for the mobile device 120.

In an embodiment of 321 and at 324, the produce identifier performs color corrections on the image sample based on results of a color calibration performed on the mobile device 120.

At 330, the produce identifier generates a signature that uniquely identifies the target item or a type of target item from the image sample.

In an embodiment, at 331, the produce identifier averages color pixel values present in the image sample to generate the signature.

In an embodiment, at 332, the produce identifier generates the signature based on one or more of: color pixel values present in the image sample, textures identified from pixel values of the image sample, and shapes identified from the pixel values of the image sample.

At 340, the produce identifier obtains an identifier for the target item based on the signature. This can be done on the device that processes the produce identifier (on device) or done through network communication to produce identifier 131 and/or transaction manager 141 (off device).

Figure 4:
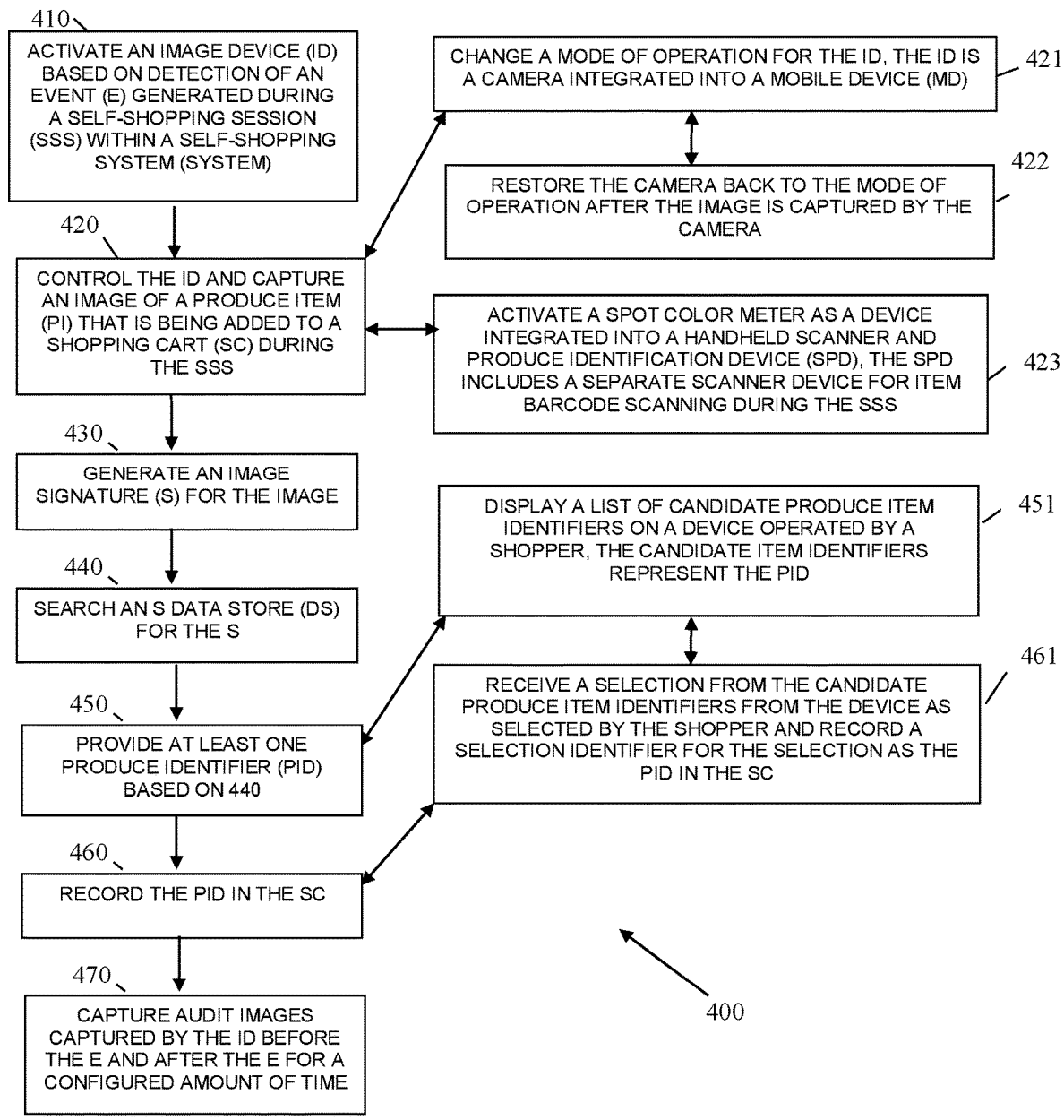
FIG. 4 is a diagram of another method for produce identification, according to an example embodiment.

FIG. 4 is a diagram of another method 400 for produce identification, according to an example embodiment. The software module(s) that implements the method 400 is referred to as a "self-shopping produce identifier." The self-shopping produce identifier is implemented as executable instructions programmed and residing within memory and/or a non-transitory computer-readable (processor-readable) storage medium and executed by one or more processors of one or more devices. The processors that execute the self-shopping produce identifier are specifically configured and programmed to process self-shopping produce identifier. The self-shopping produce identifier may have access to one or more network connections during its processing. The network connections can be wired, wireless, or a combination of wired and wireless.

In an embodiment, multiple devices execute the self-shopping produce identifier on all or some combination of handheld scanner with produce identifier 110, mobile device 120, cloud servers 130, and/or retail server 140.

In an embodiment, a single device executes the self-shopping produce identifier from either handheld scanner with produce identifier 110 or mobile device 120.

In an embodiment, the self-shopping produce identifier is all or some combination of: transaction manager 113, mobile app 122, produce identifier 131, and transaction manager 141.

In an embodiment, the self-shopping produce identifier is one of: transaction manager 113 or mobile app 122.

The self-shopping produce identifier presents another and, in some ways, enhanced processing perspective of the method 300 of FIG. 3.

At 410, the self-shopping produce identifier activates an image device based on detection of an event generated during a self-shopping session within a self-shopping system.

At 420, the self-shopping produce identifier controls the image device and captures an image of a produce item that is being added to a shopping cart during the self-shopping session.

In an embodiment, at 421, the self-shopping produce identifier changes a mode of operation for the image device. Here, the image device is a camera 121 that is integrated into a mobile device 120.

In an embodiment of 421 and at 422, the self-shopping produce identifier restores the camera 121 back to the mode of operation that existed before the change in mode at 421 after the image is captured by the camera 121. Again, this was discussed above and saves on battery power of the mobile device 120 during the self-shopping session.

In an embodiment, at 423, the self-shopping produce identifier activates a spot color meter 112 as a device integrated into a handheld scanner with produce identifier device 110. The handheld scanner with produce identifier device 110 includes a separate scanner device 111 for item barcode scanning during the self-shopping session.

At 430, the self-shopping produce identifier generates an image signature for the image. This can be a single scalar value as discussed above or a distribution of certain types of pixel values present in the image.

At 440, the self-shopping produce identifier searches a signature data store 132 for matching or attempting to match entries in the data store 132 to the signature and locating a single produce identifier or a list of candidate produce identifiers.

At 450, the self-shopping produce identifier provides at least one produce identifier based on results associated with 440. Again, this can be a single produce identifier or if no direct match is found a list of candidate produce identifiers.

For example, and in an embodiment, at 451, the self-shopping produce identifier displays a list of candidate produce item identifiers on a device operated by a shopper. The candidate item identifiers representing the at least one produce identifier at 450.

At 460, the self-shopping produce identifier records the produce item identifier in the shopping cart for the self-shopping session and self-shopping transaction.

In an embodiment of 451 and 460, at 461, the self-shopping produce identifier receives a selection from the candidate produce item identifiers as selected by the shopper and records the selection identifier for the selection as the produce identifier in the shopping cart during the self-shopping session.

According to an embodiment, at 470, the self-shopping produce identifier captures audit images captured by the image device before the event was detected and after the event is detected for a configured amount of time. This can be used for auditing.

In any of the above-noted embodiments of FIGS. 1-4, the mobile device 120 may be a mobile phone, a tablet, or a wearable processing device.

In an embodiment, of any of the above-noted embodiments of FIGS. 1-4, the color corrections for the mobile device 120 can include a machine-learning algorithm that is continually trained based on actual results for the produce item fed back into the algorithm.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
controlling an image device integrated within a second device upon an activation event detected from the second device;
capturing an image sample of a target item by the image device, wherein capturing further includes capturing the image sample after determining that the target item is at an optimal distance from the image device based on a sharpness, a contrast, and a focus of the image sample reported by the image device as compared against a predefined threshold to ensure that a dominant illumination for the image sample comes from the image device and not from ambient light associated with surroundings of the target item;
generating a signature that uniquely identifies the target item from the image sample; and
obtain an identifier for the target item based on the signature.

2. The method of claim 1 wherein controlling further includes detecting the activation event as a squeezed trigger pressed on the second device, wherein the second device is a handheld scanner and produce identifier device.

3. The method of claim 2, wherein detecting further includes activating a spot color meter as the image device, wherein the handheld scanner and produce identifier includes a scanner for scanning barcodes of items and the scanner is separate from the spot color meter.

4. The method of claim 1, wherein controlling further includes detecting the activation event as a button activation made within a user-facing interface of a mobile application that executes on the second device, wherein the second device is a mobile device.

5. The method of claim 4, wherein detecting further includes changing a mode of operation of the image device from auto-exposure mode with illumination off to white illumination with fixed exposure and fixed macro focus, wherein the image device is an integrated camera of the mobile device.

6. The method of claim 5, wherein capturing further includes performing color corrections on the image sample based on a model type associated with the mobile device.

7. The method of claim 5, wherein capturing further includes performing color corrections on the image sample based on a mobile device identifier for the mobile device.

8. The method of claim 5, wherein capturing further includes performing color corrections on the image sample based on results of a color calibration performed by the mobile device.

9. The method of claim 1, wherein generating further includes averaging color pixel values within the image sample to generate the signature.

10. The method of claim 1, wherein generating further includes generating the signature based on one or more of: color pixel values present in the image sample, textures identified from pixel values of the image sample, and shapes identified from the pixels of the image sample.

11. A method, comprising:
activating an image device based on detection of an event generated during a self-shopping session with a self-shopping system;
controlling the image device and capturing an image of a produce item that is being added to a shopping cart during the self-shopping session, wherein controlling further includes capturing the image after determining that the produce item is at an optimal distance from the image device based on a sharpness, a contrast, and a focus of the image reported by the image device as compared against a predefined threshold to ensure that a dominant illumination for the image comes from the image device and not from ambient light associated with surroundings of the produce item;
generating an image signature for the image;
searching an image signature data store for the image signature;
providing at least one produce identifier for the produce item based on the searching; and
recording the at least one produce item in the shopping cart.

12. The method of claim 11 further comprising, recoding audit images captured by the image device before the event and after the event for a configured amount of time.

13. The method of claim 11, wherein controlling further includes changing a mode of operation for the image device, wherein the image device is a camera integrated into a mobile device.

14. The method of claim 13, wherein changing further includes restoring the camera back to the mode of operation after the image is captured by the camera.

15. The method of claim 11, wherein controlling further includes activating a spot color meter as a device integrated into a handheld scanner and produce identification device, wherein the produce scanning and identification device includes a separate scanner device for item barcode scanning during the self-shopping session.

16. The method of claim 11, wherein providing further includes displaying a list of candidate produce item identifiers on a device operated by a shopper, wherein the candidate produce item identifiers represent the at least one produce identifier.

17. The method of claim 16, wherein recording further includes receiving a selection from the candidate produce item identifiers from the device as selected by the shopper and recording a selection identifier for the selection as the at least one produce identifier in the shopping cart.

18. A handheld scanner with produce identifier device, comprising:
- a scanner;
- a spot color meter;
- a trigger;
- a processor; and
- a non-transitory computer-readable storage medium comprising executable instructions:
- the executable instructions when executed by the processor from the non-transitory computer-readable storage medium cause the processor to:
- scan barcodes placed in view of the scanner;
- provide item identifiers for the barcodes to a shopping cart associated with a self-shopping transaction;
- activate the spot color meter when the trigger is activated;
- capture an image sample, by the spot color meter, of a produce item after determining that the produce item is at an optimal distance from the spot meter based on a sharpness, a contrast, and a focus of the image sample reported by the spot meter as compared against a predefined threshold to ensure that a dominant illumination for the image sample comes from the spot meter and not from ambient light associated with surroundings of the produce item;
- cause an image signature to be generated from the image sample that uniquely identifies the produce item and provides a produce identifier to the shopping cart for the self-shopping transaction; and
- deactivate the spot color meter after the image sample is captured or when the trigger is released.

19. The handheld scanner with produce identifier device of claim 18 further comprising an aperture in front of the scanner and the spot color meter, the aperture enclosed in a housing.

* * * * *